(12) United States Patent
Ge

(10) Patent No.: US 8,587,632 B2
(45) Date of Patent: Nov. 19, 2013

(54) ELECTRONIC DEVICE AND COMMUNICATION METHOD THEREOF

(75) Inventor: Bin-Bin Ge, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 197 days.

(21) Appl. No.: 13/116,007

(22) Filed: May 26, 2011

(65) Prior Publication Data
US 2012/0249720 A1 Oct. 4, 2012

(30) Foreign Application Priority Data

Apr. 2, 2011 (CN) .......................... 2011 1 0083377

(51) Int. Cl.
*H04N 7/14* (2006.01)
(52) U.S. Cl.
USPC .......................... 348/14.02; 370/379; 370/455

(58) Field of Classification Search
None
See application file for complete search history.

(56) References Cited

U.S. PATENT DOCUMENTS

| 6,591,116 B1* | 7/2003 | Laurila et al. ................. 455/558 |
| 2007/0197234 A1* | 8/2007 | Gill et al. ....................... 455/458 |
| 2009/0172657 A1* | 7/2009 | Makelainen et al. .......... 717/174 |

* cited by examiner

*Primary Examiner* — Duc Nguyen
*Assistant Examiner* — Theodore Ndje
(74) *Attorney, Agent, or Firm* — Altis & Wispro Law Group, Inc.

(57) ABSTRACT

An electronic device receives a first subscriber identity module (SIM) card and a second SIM card. The first SIM card and the second SIM card are compatible with a first protocol network and a second network. The electronic device can transmit voice data to a second electronic device via the first protocol network, and upload video data of the electronic device to a server via the second protocol network. The electronic device further downloads video data of the second electronic device from the server via the second protocol network.

8 Claims, 5 Drawing Sheets

ELECTRONIC DEVICE AND COMMUNICATION METHOD THEREOF

BACKGROUND

1. Technical Field

The present disclosure relates to an electronic device and a communication method thereof.

2. Description of Related Art

Video calling is a useful function of 3G mobile phones. It can offer face-to-face communication and facilitate sign language communication. However, the costly rate of the video calls hinders it from becoming ubiquitous. Additionally, another disadvantage is that one cannot place a video call in an area without any 3G base stations, and if an area only has a few 3G base stations, the quality of the video calls may be poor.

DETAILED DESCRIPTION

In general, the word "module" as used herein, refers to logic embodied in hardware or firmware, or to a collection of software instructions, written in a programming language, such as, for example, JAVA, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
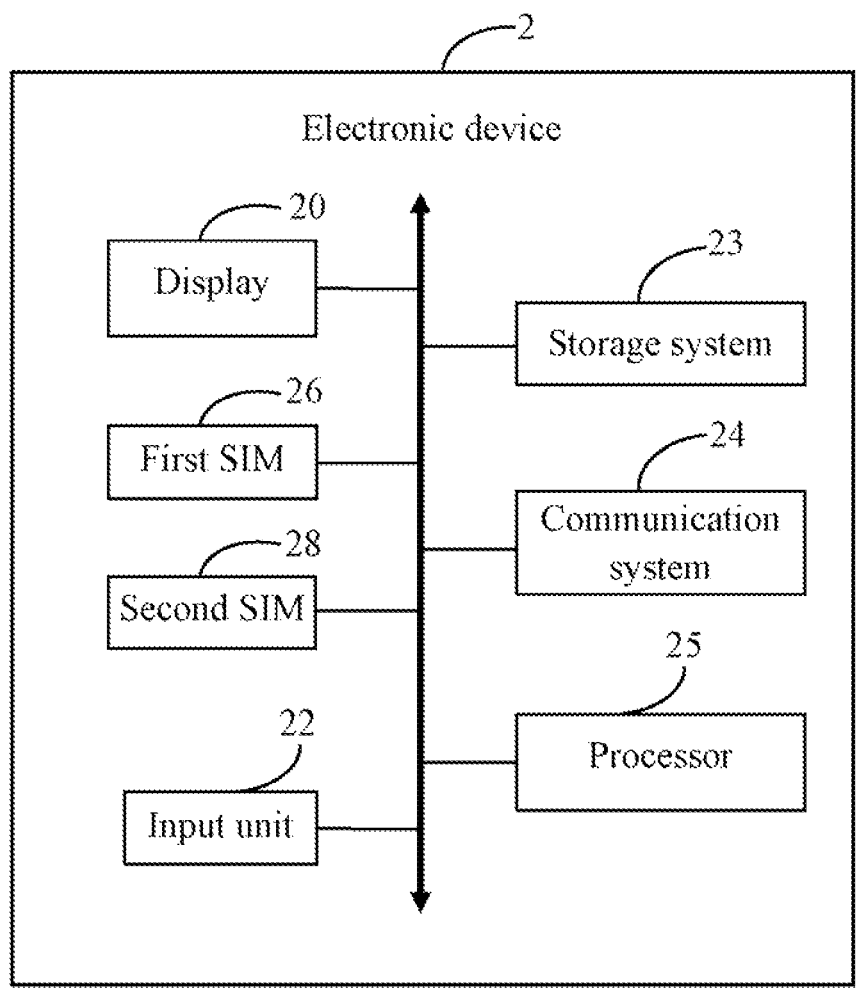
FIG. 1 is a block diagram of an exemplary embodiment of an electronic device.

FIG. 1 is a block diagram of an exemplary embodiment of an electronic device 2. The electronic device 2 includes a display 20, an input unit 22, a storage system 23, a communication system 24, and a processor 25. The electronic device 2 is further capable of receiving a first subscriber identity module (SIM) card 26 and a second SIM card 28 compatible with a first protocol network and a second protocol network, respectively. The electronic device 2 can access the first protocol network and the second protocol network. In one exemplary embodiment, the first protocol network can be a Global System for a Mobile Communications (GSM) network and the second protocol network can be an International Mobile Telecommunications-2000 (IMT-2000) network. The IMT-2000 network may include, for example, WCDMA, TD-SCDMA, and CDMA2000.

Figure 2:
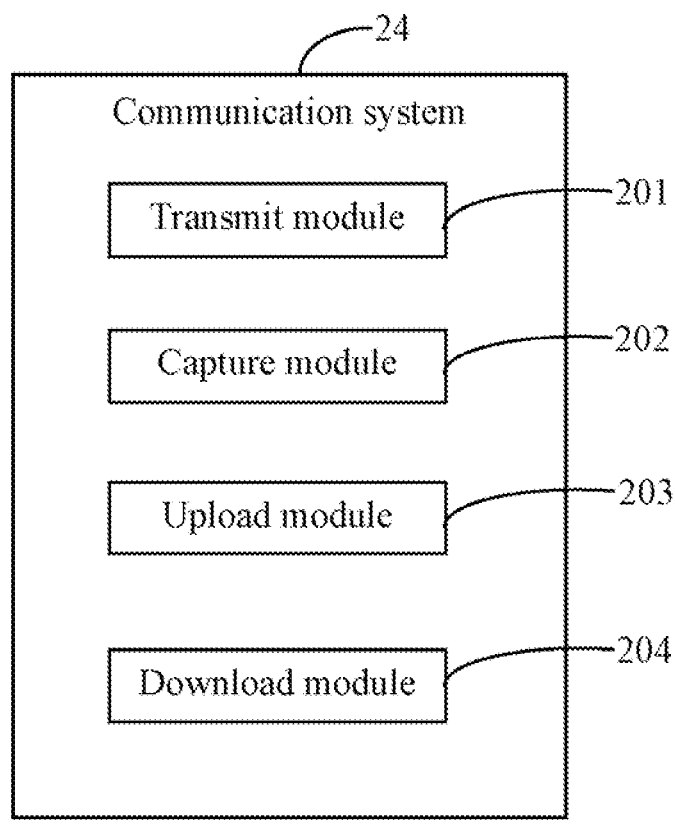
FIG. 2 is a block diagram of an exemplary embodiment of a communication system shown in FIG. 1.

FIG. 2 is a block diagram of an exemplary embodiment of the communication system 24 shown in FIG. 1. The communication system 24 includes a transmit module 201, a capture module 202, an upload module 203, and a download module 204. The modules 201-204 may include computerized code in the form of one or more programs that are stored in the storage system 23. The computerized code includes instructions that are executed by the processor 25 to provide functions for the modules 201-204. The input unit 22 can be a keypad or a function key used to activate the communication system 24.

The transmit module 201 transmits voice data to a second electronic device (not shown) via the first protocol network when establishing a phone call between the first and the second electronic device. The capture module 202 captures video data of the electronic device 2 using an image capture unit of the electronic device 2, such as a charge coupled device (CCD). The upload module 203 correlates the video data of the electronic device 2 with the phone number of the first SIM card 26, so the user of the second electronic device knows who the phone call is from. The upload module 203 further uploads the video data of the electronic device 2 to a server (not shown) via the second protocol network. The server can be a server capable of performing video relay established by a telecommunication operator. The download module 204 downloads video data of the second electronic device from the server via the second protocol network. The display 20 may be a LCD screen or a touch screen. The download module 204 further transmits the video data of the second electronic device to the display 20.

Figure 3:
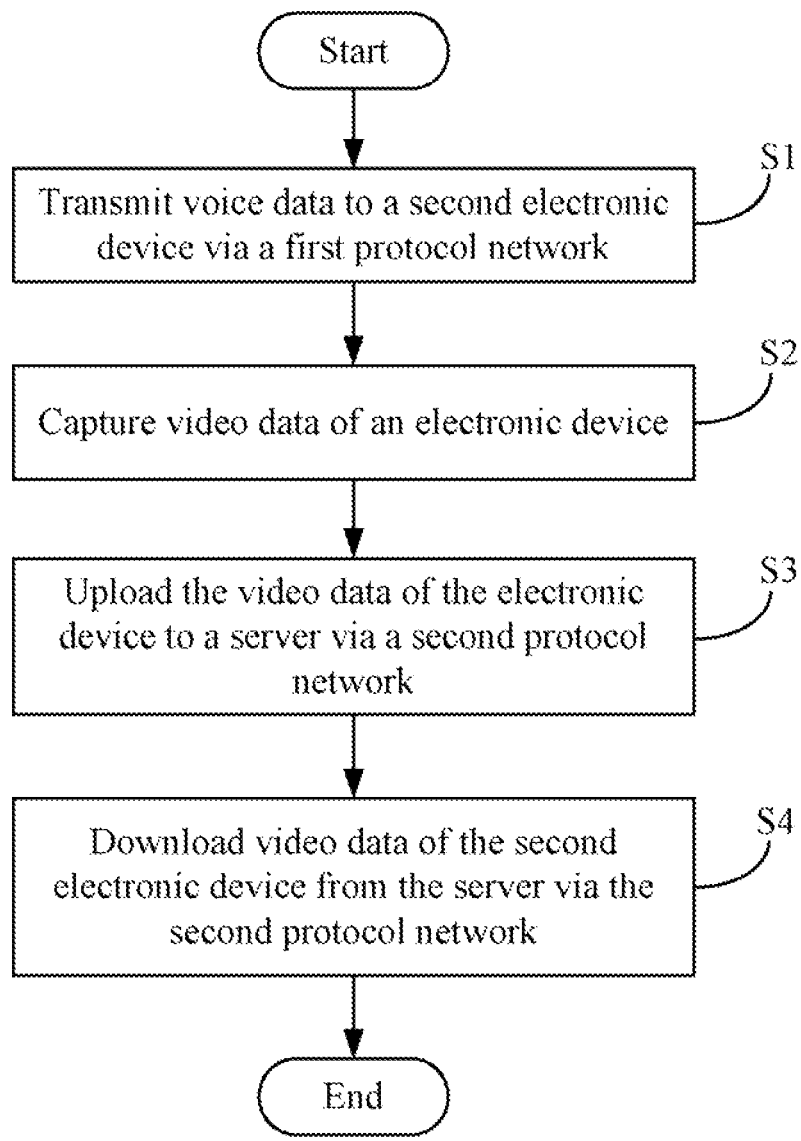
FIG. 3 is a flowchart illustrating an exemplary embodiment of a communication method of an electronic device.

FIG. 3 is a flowchart illustrating an exemplary embodiment of a communication method of the electronic device 2. Depending on the embodiment, additional blocks in the flow of FIG. 3 may be added, others removed, and the ordering of the blocks may be changed.

In block S1, the transmit module 201 transmits the voice data to the second electronic device via the first protocol network.

In block S2, the capture module 202 captures the video data of the electronic device 2.

In block S3, the upload module 203 correlates the video data of the electronic device 2 with the phone number of the first SIM card 26, so the user of the second electronic device knows who the phone call is from. The upload module 203 further uploads the video data of the electronic device 2 to the server via the second protocol network.

In block S4, the download module 204 downloads the video data of the second electronic device from the server via the second protocol network.

Figure 4:
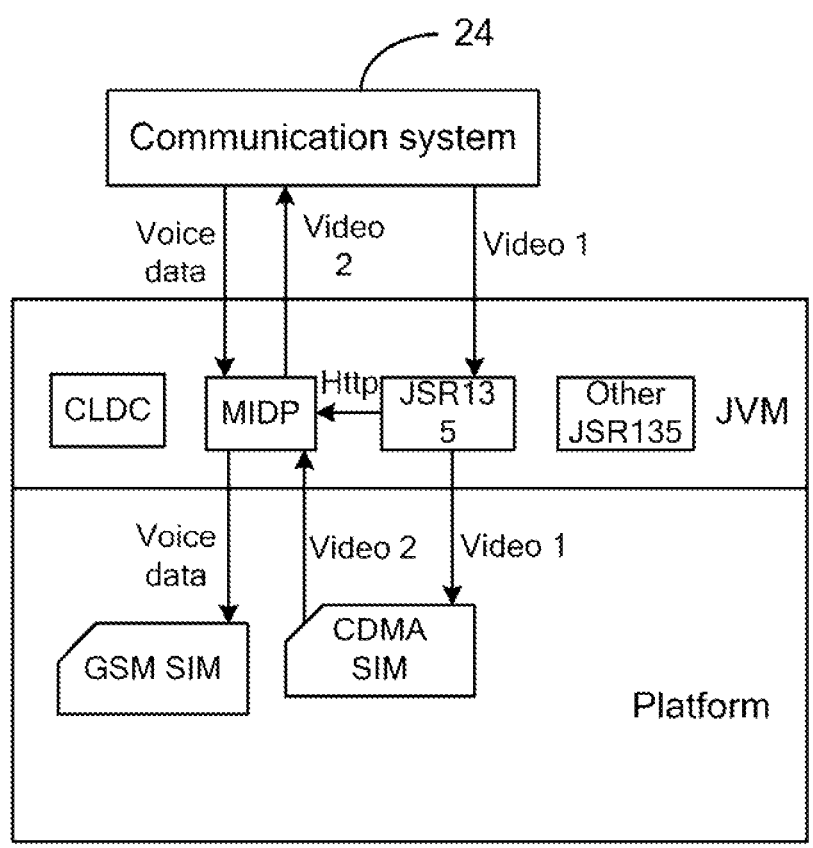
FIG. 4 is an exemplary operation of a communication system shown in FIG. 1.

FIG. 4 is an exemplary operation of the communication system 24 shown in FIG. 1. The electronic device 2 further includes a JAVA Virtual Machine (JVM) stored in the storage system 23. In one exemplary embodiment, the transmit module 201 transmits the voice data to a GSM SIM card (i.e. the first SIM card 26) via a Mobile Information Device Profile (MIDP) of the JVM. The transmit module 201 transmits a Video 1 (i.e. the video data of the electronic device 2) to a CDMA card (i.e. the second SIM card) via a JAVA Specification Requests (JSRs) of the JVM. The download module 204 downloads Video 2 (i.e. the video data of the second electronic device) from the CDMA card.

Figure 5:
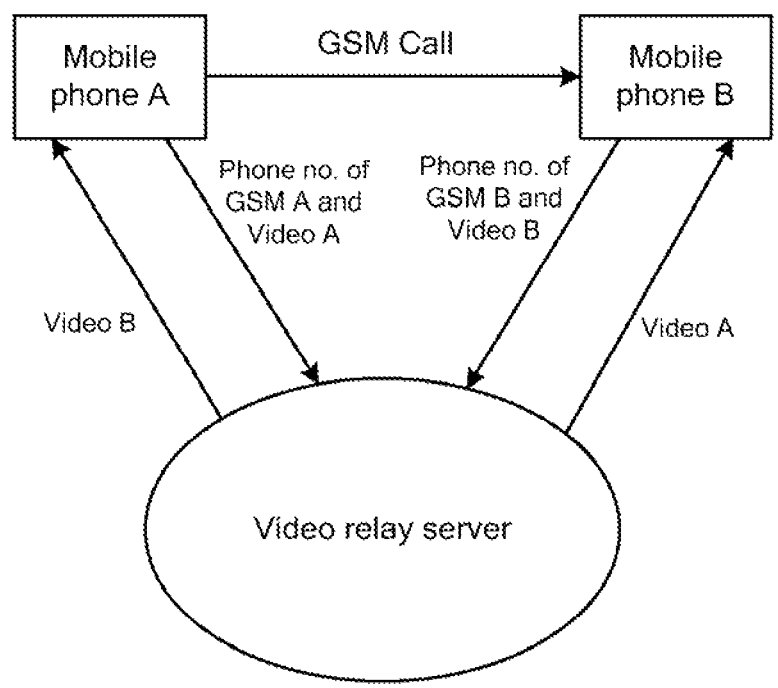
FIG. 5 is an exemplary operation of video data transmission of a video call according to the present disclosure.

FIG. 5 is an exemplary operation of video data transmission of a video call according to the present disclosure. A mobile phone A communicates with a mobile phone B via a GSM call. The mobile phone A correlates video data of the mobile phone A (Video A) with a phone number of a GSM card A of the mobile phone A, so the user of the mobile phone B knows who the phone call is from. The mobile phone A further uploads the Video A to a video relay server. The mobile phone B correlates video data of the mobile phone B (Video B) with a phone number of a GSM card B of the mobile phone B, so the user of the mobile phone A knows who the phone call is from. The mobile phone B further uploads the Video B to the video relay server. The mobile phone A downloads the Video B from the video relay server. The mobile phone B downloads the Video A from the video relay server The present disclosure provides an electronic device and a communication method thereof. A video call between the electronic device and other devices can be established by transmitting voice data via GSM network and transmitting video data via CDMA network. GSM network is generally more widespread than CDMA network, so that the quality of the voice data of the video call can be stable. Cost of a GSM call is cheaper than the cost of a traditional video call, and therefore the cost of the video call can be reduced.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented communication method of an electronic device, the electronic device receiving a first subscriber identity module (SIM) card compatible with a first protocol network and a second SIM card compatible with a second protocol network, the method comprising:
   transmitting voice data to a second electronic device via the first protocol network when the electronic device communicates with the second electronic device;
   using the electronic device to capture video data;
   correlating the video data of the electronic device with a phone number of the first SIM card;
   uploading the video data to a server via the second protocol network; and
   downloading video data of the second electronic device from the server via the second protocol network.

2. The method of claim 1, wherein the electronic device comprises a JAVA Virtual Machine (JVM), the method further comprising:
   transmitting the voice data to the first SIM card via a Mobile Information Device Profile (MIDP) of the JVM.

3. The method of claim 2, further comprising:
   transmitting the video data of the electronic device to the second SIM card via a JAVA Specification Requests (JSRs) of the JVM.

4. The method of claim 3, wherein the first protocol network is a Global System for a Mobile Communications (GSM) network and the second protocol network is an International Mobile Telecommunications-2000 (IMT-2000) network.

5. An electronic device receiving a first subscriber identity module (SIM) card compatible with a first protocol network and a second SIM card compatible with a second protocol network, comprising:
   a storage system;
   at least one processor;
   one or more programs stored in the storage system and being executable by the at least one processor, the one or more programs comprising:
   a transmit module operable to transmit voice data to a second electronic device via the first protocol network;
   a capture module operable to capture video data;
   an upload module operable to correlate the video data of the electronic device with a phone number of the first SIM card;
   the upload module further operable to upload the video data to a server via the second protocol network; and
   a download module operable to download video data of the second electronic device from the server via the second protocol network.

6. The electronic device of claim 5, further comprises a JAVA Virtual Machine (JVM), wherein the transmit module transmits the voice data to the first SIM card via a Mobile Information Device Profile (MIDP) of the JVM.

7. The electronic device of claim 6, wherein the transmit module transmits the video data of the electronic device to the second SIM card via a JAVA Specification Requests (JSRs) of the JVM.

8. The electronic device of claim 7, wherein the first protocol network is a Global System for a Mobile Communications (GSM) network and the second protocol network is an International Mobile Telecommunications-2000 (IMT-2000) network.

* * * * *